United States Patent [19]
Valyi

[11] Patent Number: 5,939,153
[45] Date of Patent: Aug. 17, 1999

[54] MULTILAYERED PLASTIC CONTAINER

[75] Inventor: Emery I. Valyi, Katonah, N.Y.

[73] Assignee: The Elizabeth and Sandor Valyi Foundation, Inc., New York, N.Y.

[21] Appl. No.: 08/969,479

[22] Filed: Nov. 13, 1997

[51] Int. Cl.$^6$ .................................................. B65D 25/00
[52] U.S. Cl. ........................... 428/1; 428/34.7; 428/35.7; 428/36.6; 428/36.91; 428/213; 428/542.8; 215/12.1; 215/12.2; 220/62.12; 220/62.15; 220/62.22
[58] Field of Search .............................. 428/1, 34.6, 34.7, 428/35.4, 35.7, 36.6, 36.7, 36.9, 36.91, 213, 413, 414, 446, 448, 480, 542.8; 220/62.12, 62.15, 62.22; 215/12.1, 12.2; 264/512; 427/429, 428, 256

[56] References Cited

U.S. PATENT DOCUMENTS

| | | |
|---|---|---|
| 3,442,686 | 5/1969 | Jones ........................................... 117/70 |
| 3,869,056 | 3/1975 | Valyi ............................................ 215/1 |
| 4,092,391 | 5/1978 | Valyi ......................................... 264/97 |
| 4,149,645 | 4/1979 | Valyi ............................................ 215/1 |
| 5,006,381 | 4/1991 | Nugent, Jr. et al. .................... 428/35.4 |
| 5,008,137 | 4/1991 | Nugent, Jr. et al. .................... 428/35.4 |
| 5,464,106 | 11/1995 | Slat et al. ................................ 215/12.1 |
| 5,573,819 | 11/1996 | Nugent, Jr. et al. .................... 428/34.8 |
| 5,612,101 | 3/1997 | Furuta et al. ................................. 428/1 |
| 5,645,183 | 7/1997 | Slat et al. ................................ 215/12.2 |
| 5,759,653 | 6/1998 | Collette et al. ......................... 428/35.9 |

*Primary Examiner*—Rena L. Dye
*Attorney, Agent, or Firm*—Bachman & LaPointe, P.C.

[57] ABSTRACT

Process for forming a multilayered plastic article and multilayered plastic preform and container, wherein a polyepoxide or a liquid crystal polymer in the liquid form is applied to a substrate in a thickness which varies over the extent of the substrate to form a multilayered substrate, forming a tubular liner from said multilayered substrate, and coating the tubular liner with an outer layer.

23 Claims, 3 Drawing Sheets

MULTILAYERED PLASTIC CONTAINER

BACKGROUND OF THE INVENTION

The present invention relates to the preparation of multilayered plastic preforms and containers including a barrier layer.

Multilayered plastic preforms and containers are well known and advantageous, see for example, U.S. Pat. Nos. 3,869,056, 4,149,645, 4,092,391 and 5,464,106.

A conventional method for making the liners for the multilayered articles is by preparing a multilayered laminate and thermoforming the laminate into a tubular article, followed by coating the tubular article to form a tubular preform. The multilayered tubular preform may then be converted to a multilayered container by blow molding.

The multilayered laminate may include a barrier layer made of a thermoplastic barrier material, as polypropylene (PP), ethylene vinyl alcohol (EVOH), polyethylene naphthalate (PEN) or an acrylonitrile copolymer, for example.

The processes available to effect conversion of a multilayered laminate into a liner result intrinsically in disadvantageous differences in the wall thickness of the liner. Thus, the neck portion of the liner tends to be thicker than the body portion because that part of the tube or sheet from which the neck portion is made undergoes less stretching than the body portion. Similarly, the bottom portion of the liner tends to be thick if it is the location of a tube's welded end, with a near double thickness, or because the bottom portion of a sheet remains at original gage. Control of the barrier thickness is at best extremely difficult, and it is nearly impossible to obtain optimal thickness distribution for the barrier, which in most instances requires the least barrier thickness at the neck and the most in the body portion. Typically, the barrier is a part of the liner, and the liner is typically made from a laminated tube or sheet, and the barrier is therefore one of the layers therein.

An example of a barrier to the migration of $CO_2$ or $O_2$ is EVOH, but it is cost-effective only if it is protected from moisture because its permeation resistance decreases sharply as it absorbs moisture. Thus, an exemplary liner for a container for water-based liquids may be composed of a laminate with a polypropylene (PP) layer to protect the next layer of the gas barrier EVOH, followed by yet another layer, for example of polyethylene terephthalate (PET), all of it perhaps molded from a tube or sheet.

Yet another disadvantage to present practices is the practical limitation for the barrier component of the liner to be easily formable and of relatively inexpensive materials, typically thermoplastics. Thus, excellent barrier materials that are thermosetting, e.g. polyepoxides and expensive thermoplastics, e.g. liquid crystal polymers (LCPs), and the inorganic oxides of silicon, $SO_x$, find no practical use in liners. The epoxides are now used as barriers for PET bottles, but in a manner that is inconvenient, expensive and environmentally undesirable, the LCP's are prohibitively expensive if used in quantities dictated by current methods of application to rigid containers, and $SiO_x$ not at all.

It is, therefore, a principal object of the present invention to provide an improved process for forming a multilayered plastic container, and an improved multilayered preform and multilayered container.

It is a further object of the present invention to provide a process, preform and container as aforesaid including a barrier material where the barrier material varies in thickness.

It is a still further object of the present invention to provide a process, preform and container as aforesaid which uses polyepoxides, LCP's or inorganic glasses, such as $SiO_x$, as barrier materials.

It is an additional object of the present invention to provide a process, preform and container as aforesaid which is inexpensive and commercially feasible compared to current methods.

Further object and advantages of the present invention will appear hereinbelow.

SUMMARY OF THE INVENTION

In accordance with the present invention, the foregoing objects and advantages are readily obtained.

The multilayered plastic container of the present invention comprises: an upper portion having at least an inner layer and an outer layer; an intermediate sidewall portion having at least an inner layer and an outer layer; and a base portion generally self-supporting, having at least an inner layer and an outer layer; wherein said inner layer is a laminate having an innermost layer and a second layer between the innermost layer and the outer layer, generally adjacent the outer layer, said second layer having a thickness which varies from the upper portion to the sidewall portion and which varies from the sidewall portion to the base portion, and wherein said second layer is a barrier material selected from the group consisting of a polyepoxide, a liquid crystal polymer, and an inorganic barrier material, as a silicon oxide. Preferably, the inner layer is a laminate with said second layer comprising at least one central layer thereof and an outermost layer adjoining the outer layer. The central layer is preferably thicker at the sidewall portion than at least one of the upper wall portion and the base wall portion.

The present invention also resides in a preform for forming the multilayered container, and a process for forming the multilayered preform and container.

The process comprises: applying to a substrate a material selected from the group consisting of a polyepoxide, a liquid crystal polymer, and an inorganic barrier, said material being in the flowable condition, to a plastic substrate in a thickness which varies over the extent of said substrate, to form a multilayered substrate; forming a liner from said multilayered substrate; and coating said liner with an outer layer to form a preform wherein said multilayered substrate is an inner layer of said preform. Several layers of other materials may be applied over said inner layer to form the multilayered structure. The preform is desirably blow molded into a multilayered container.

Further features of the present invention and advantages of the present invention will appear hereinbelow.

BRIEF DESCRIPTION OF THE DRAWINGS

The present invention will be more readily understood from a consideration of the following illustrative drawings, wherein.

DETAILED DESCRIPTION OF PREFERRED EMBODIMENTS

Figure 1:
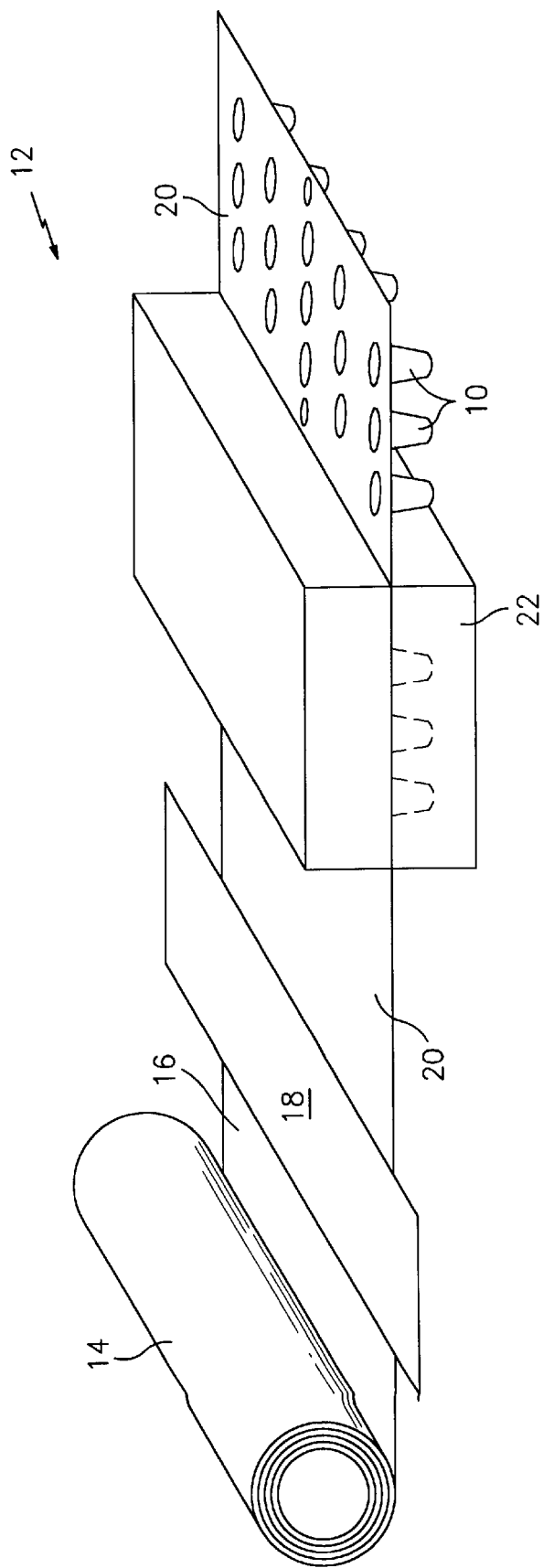
FIG. 1 is a partly schematic view of a process which may be used to form liners in the present invention.

If one assumes as an example that the structural, i.e., outermost, load bearing layer is PET, this layer will have a limited permeation resistance. Given its limited permeation resistance, this would necessitate a wall thickness and therefore a weight of the container if made from PET alone, that would render it uneconomical if it had to have commercially acceptable gas retention and/or exclusion over a commercially useful period of time, meaning shelf life. The purpose of a liner for the PET is to provide sufficient gas permeation resistance at acceptable cost and to provide commercially acceptable shelf life, while reducing the thickness/weight of PET, in this example.

A favorable group of barrier materials is the polyepoxides, especially the epoxy-amine thermosetting resins disclosed for example in U.S. Pat. Nos. 5,008,137 and 5,006,381, the disclosure of which is incorporated herein by reference. They are used currently by spraying them onto the outside of bottles as described in the aforesaid patents. Thus, for example, to compare them with EVOH, the oxygen permeability of EVOH rises from sufficient near 0% relative humidity, to a point below usefulness at or near 100% relative humidity, e.g., in contact with water as it would be inside a beverage container; whereas the oxygen permeability of the above polyepoxides remains sufficient and unaffected by ambient moisture. Accordingly, the polyepoxides do not require to be shielded from beverage contact, while for EVOH it is necessary to interpose a moisture barrier, e.g., polypropylene or polyethylene or the like to protect the EVOH. While several ways are used to apply polyepoxides to film substrates, the only practical way to date to apply them to rigid containers is to spray them on the outside. This is inconvenient, inexact and expensive, requiring special apparatus for environmental protection.

Naturally, it would be highly desirable to provide other methods than spraying to apply epoxy-amine onto the containers. For example, it would be desirable to apply the compositions to flat surfaces, such as to films, as by roller or spreader or the like or by printing. This procedure has several advantages over spraying, including the following:

a higher weight percent of solids may be applied to obtain improved permeation resistance, the application is faster and requires less costly apparatus, the polyepoxide must be dissolved and/or dispersed in a carrier to render it sprayable, at the necessary low viscosity. In consequence, the sprayed coating requires removal of the carrier, fluid or dispergant, in an environmentally undesirable process, none of which is required for coating in the flat, by the above-mentioned coating procedures that are available for flat surfaces.

The present invention entails the use of simple and convenient procedures to spread the barrier material onto a substrate in liquid form, as for example, as a flat coat, with a doctor knife, by roller or brush, or by printing, then bonding said substrate to an outer, structural layer and conversion thereof to a plastic container. This represents a considerable improvement over spraying onto the finished container, the procedure heretofore used.

Thus, in accordance with the present invention, the barrier layer is applied in liquid, i.e., flowable form, to a substrate in the form of a generally flat film and the substrate thus coated is then used as part of a laminated sheet from which a multilayered liner is formed. If the liner is to be produced from a tube, the substrate is supplied in tubular form and its outside coated, as by rollers, by brush coating, printing or the like, or by vertically pulling the tube through a bath of the coating composition. In this manner the aforesaid polyamine-polyepoxide compositions are economically applied. Also, being ultimately placed within the container wall, rather than on the outside, as heretofore, they are not prone to damage by scratching and external environmental effects.

In accordance with the present invention, application of the barrier to a substrate in flowable condition has the advantage of enabling application of thin layers under close control of the layer thickness and its distribution. Significant advantages are thus obtainable.

As above noted, the liner is for the inside of a preform. Thus, its shape must conform exactly to the inner surface of the preform. To obtain said shape, the original form of the liners, be it a sheet for thermoforming, or a tube for blow-molding it, must be deformed. Once inside the preform, it is further severely deformed in the course of blow molding or stretch-blow molding the lined preform into a finished container shape. Accordingly, the liner materials, including the barrier layer encased within its layers, should exhibit sufficient ductility to render possible such deformation. The materials for lined containers according to the above cited patents are chosen accordingly, and thus limited. The polyepoxides, in their finished, i.e., cured state, are unable to undergo severe deformation, as in a total stretch ratio of 1:20, or more, from flat sheet to blown shape, as is typical for a bottle.

Accordingly, the polyepoxide layer originally applied to a sheet or tube, will exhibit fissures and other discontinuities by the time it is converted into the finished container's lining.

The rate of gas permeation through a membrane is linearly dependent upon the net surface area and of the thickness of the barrier. Thus, in order to offset the elimination of the effective barrier surface that will be present in the finished container, the polyepoxide layer that is originally deposited must be made thick enough in the same ratio as the effective surface is diminished, thereby offsetting the presence of the discontinuities referred to above.

Liquid crystal polymers (LCP) are among the best organic barrier materials, with 100 and 200 times greater resistance to gas permeation than, for example, PET. However, they are costly, at this time up to some 30 times the current price of PET. Accordingly, they can be afforded in the liners only if used in the quantity dictated by the container's shelf-life specification and no more, meaning very thin layers of LCP.

Whichever may be the method of thus applying the LCP layer, it is too brittle to undergo the necessary deformation, as indicated. The LCP fractures into flake-like platelets, with gaps in between that diminish permeation resistance of the structure. Given the fracture pattern of LCP, which it has in common with other materials that may serve as barriers, it is possible to offset the fractures not only by increasing the layer thickness, as described for polyepoxides, but by applying the layer in multiple stages, one sub-layer upon a next, with at least two sub-layers and preferably three or more. The advantage of this procedure is in the reduced total thickness for a given permeation resistance requirement, for the following reason: the several sublayers, each fracturing into this respective platelet-patterns, will act as roof-shingles do. The platelets being randomly distributed, and independently configured sub-layer by sub-layer, a platelet of one sublayer is likely to be positioned over a fissure in another sublayer. In this manner, the total layer thickness is substantially reduced, as is clearly apparent.

Yet another group of excellent barrier materials is represented by inorganic oxides, particularly oxides of silicon, $SiO_x$ with x between 1 and 2. These are applied by vapor deposition, as described in U.S. Pat. No. 3,442,686, with many improvements, for example, recited in a paper entitled "Plasma Deposited Silica Coatings" by John T. Felts, COEX '89 Conference Proceedings, 1989. The most efficient deposition process appears to be plasma activated chemical vapor deposition. 1000 Å layers yield desirable gas barrier properties, according to the present state of this technology. These await better methods of application, as well as economical processes of depositing other inorganic coatings, e.g., silicon nitride, or doped metal-oxide or fluoride.

These substances exhibit chemical inertness and dense morphologies, and are therefore exceptional gas barriers.

$SiO_{1.7}$ is the equal of PET, but in layers that are near 10,000 times thinner than PET.

To use these materials, it is proposed to apply them in a manner similar to that described above for LCPs, except that the barrier layer in this case is produced, for example, by plasma enhanced vapor deposition. Naturally, chemical deposition may also be considered, including metals from their respective carbonyls, aluminum compounds currently used as waterproofing agents, and other inorganic compounds.

Accordingly, a process is proposed to use relatively brittle barrier materials in multi-layered containers, as well as materials whose cost permits this use only in substantially smaller quantities than is the case with barrier materials according to current practice.

It is not possible using conventional procedures to practically employ these materials without obtaining intrinsic thickness variations, i.e., different thicknesses of barrier in the body portion, the neck and base. In conventional procedures, one does not obtain a substantially uniform wall thickness of the barrier. If made by thermoforming, which is desirable, the thickness of the original sheet stretches less near the upper end and therefore remains thicker than that portion of the sheet that is formed into the body, while the bottom obtains yet another thickness. Analogous differences occur when the liner is made from a tube rather than from a sheet. In addition, when the liner is incorporated in a multilayer preform and blown into finished shape, the wall thickness, and with it the liner thickness, changes according to the deformation pattern of preform-to-blown article.

However, in accordance with the present invention, the barrier may be applied in different layer thicknesses, onto a substrate, as by gravure printing, such that the deposited layer varies in a predetermined manner according to the location on the substrate that will correspond to predetermined locations on the finished article. Naturally, the respective locations must be kept in register by known means during the several steps of printing and liner forming.

Referring to FIG. 1, liners 10 are formed in apparatus 12 in an exemplificative embodiment. Thus, a coil 14 of thermoplastic material 16, which may for example include layers of PET or polypropylene, and two, three or more layers of different plastic materials, including one of the aforesaid barrier materials as above and applied as described above, to provide a multilayered structure, is fed to thermoforming means 22. Alternatively, a layer made of a material 16 with insufficient barrier properties, e.g., PET or polypropylene is fed to printing device 18 wherein one of the aforesaid barrier materials is applied to thermoplastic material 16 as by printing in a predetermined thickness distribution so as to provide the desired thickness in the finished article. The resulting finished sheet 20, having the barrier material applied thereto, is fed to a thermoforming means 22 wherein a plurality of thermoformed, barrier-coated liners 10 are formed, which may be separated from sheet 20, or a plurality removed with sheet 20, depending on subsequent processing requirements.

Figure 2:
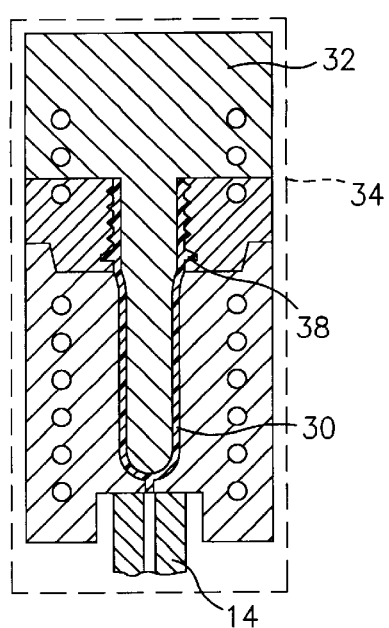
FIG. 2 is a sectional view of the process for preparing a preform.
Figure 3A:
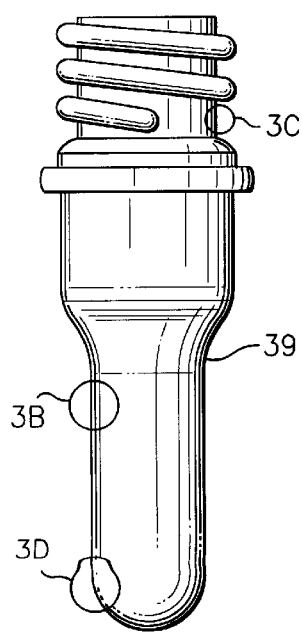
FIG. 3A is a side view of a the preform prepared in FIGS. 2, and FIGS. 3B, 3C and 3D are enlarged cross-sectional views of various areas of the preform of FIG. 3A.

Laminated preform 30 shown in FIG. 2 may be formed by pressure molding an outer layer, as PET, over coated liner 10, as shown in FIG. 2, in pressure mold 32 in a pressure molding apparatus 34 shown in dashed lines. The preform may have any desired or convenient configuration, including the desired neck finish 38. An alternative configuration is shown by laminated preform 39 in FIG. 3A.

Figure 3B:
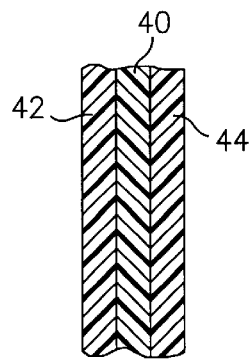
Figure 3C:
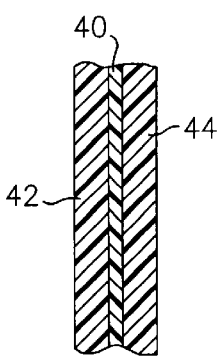
Figure 3D:
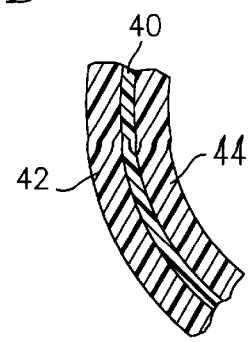

FIGS. 3B, 3C and 3D show the different thicknesses for barrier layer 40 in various locations, wherein barrier layer 40 is shown as the central layer surrounded by outer layer 42 and inner layer 44. Note that in FIG. 3B which shows a sidewall portion, barrier layer 40 is relatively thick where the barrier is needed; whereas, in FIG. 3C which shows the neck portion, the barrier layer 40 is relatively thin, and at the base wall portion shown in FIG. 3D the barrier layer 40 is thinner than at the sidewall portion, but thicker than at the neck portion. Outer layer 42 is the injection molded PET layer, and inner layer 44 is the liner. Thus, controlled thickness layers are obtained for the barrier that are different according to its location in the preform, as needed.

Figure 4:
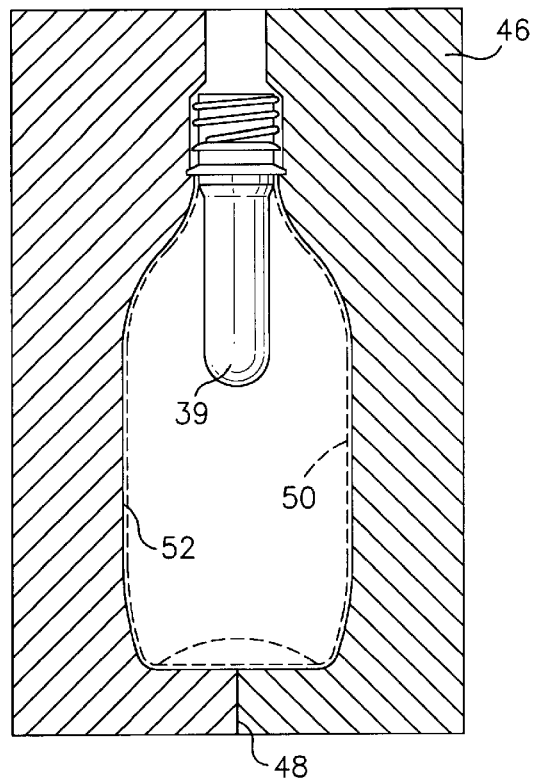
FIG. 4 is a view of the blow molding step.
Figure 5:
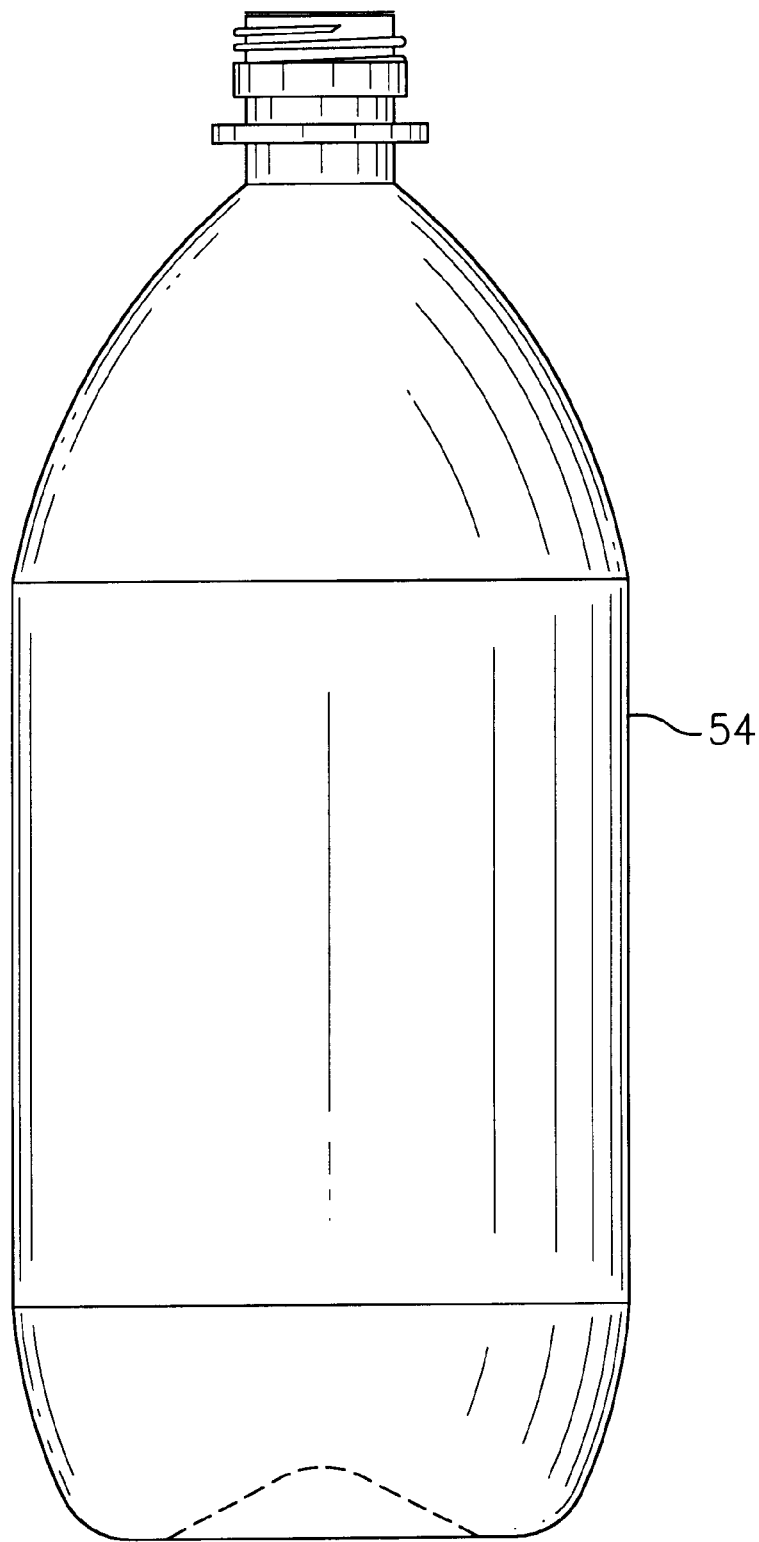
FIG. 5 is a view of the finished container.

The blow molding operation is shown in FIG. 4 and is well known. Preferably, preform 39 is blow molded, desirably without the need to heat it prior to the blowing operation. Thus, laminated preform 30 or 39 is transferred to blow mold 46, which may be separable along split or separation line 48, and expanded into the final desired shape shown by dashed line 50, into conformance with the blow mold cavity 52, by means well known. The final, blown article 54 is shown in FIG. 5 and is characterized by the highly desirable, programmed barrier thickness as discussed hereinabove, for example, with thickest barrier portion at the sidewall, thinnest at the neck and intermediate at the base.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A multilayered plastic container, which comprises:
   an upper portion having at least an inner layer and an outer layer;
   an intermediate sidewall portion having at least an inner layer and an outer layer; and
   a base portion having at least an inner layer and an outer layer;
   wherein said inner layer is a laminate having an innermost layer and a second layer between the innermost layer and the outer layer, said second layer having a thickness which varies from the upper portion to the sidewall portion and which varies from the sidewall portion to the base portion, and wherein said second layer is a barrier material selected from the group consisting of a polyepoxide, a liquid crystal polymer, and an inorganic barrier material, wherein the barrier layer is thicker at the sidewall portion than at the upper portion.

2. A container according to claim 1, wherein said inner layer is a laminate with said second layer comprising at least one central layer of said laminate, and an outermost layer of said inner layer laminate adjoining said outer layer.

3. A container according to claim 2, wherein said at least one central layer has a different thickness at the sidewall portion than the upper and base portions.

4. A container according to claim 1, wherein said container is a rigid container.

5. A container according to claim 1, wherein said innermost layer is selected from the group consisting of polypropylene and polyethylene terephthalate which varies from the sidewall portion to the base portion and which varies from the upper portion to the sidewall portion.

6. A container according to claim 1, wherein said container is blow molded.

7. A container according to claim 2, wherein said second layer is applied in flowable form.

8. A container according to claim 7, wherein said second layer is applied in a manner selected from the group consisting of printing, roller coating, brush coating and spreading.

9. A container according to claim 1, wherein said second layer includes at least two sub-layers directly adjacent each other to eliminate the effect of a fracture in one of said sub-layers.

10. A container according to claim 1, wherein the barrier layer is thinnest at the upper portion and has a thickness intermediate the sidewall and upper portions at the base portion.

11. A container according to claim 1, wherein the barrier layer is thicker at the sidewall portion than at the base portion.

12. A container according to claim 1, wherein the barrier layer has substantially uniform thickness at the sidewall portion.

13. A multilayered plastic preform, which comprises:
an upper portion having at least an inner layer and an outer layer;
an intermediate sidewall portion having at least an inner layer and an outer layer; and
a base portion having at least an inner layer and an outer layer;
wherein said inner layer is a laminate having an innermost layer and a second layer between the innermost layer and the outer layer and said second layer being a barrier material selected from the group consisting of a polyepoxide, a liquid crystal polymer, and an inorganic barrier material, wherein said second layer has a thickness which varies from the sidewall portion to the base portion and which varies from the upper portion to the sidewall portion, wherein the barrier layer is thicker at the sidewall portion than at the upper portion.

14. A preform according to claim 13, wherein said inner layer is a laminate with said second layer as a central layer of said laminate, and an outermost layer of said inner layer laminate adjoining said outer layer.

15. A preform according to claim 14, wherein said central layer is thicker at the sidewall portion than at the upper portion and than at the base portion.

16. A preform according to claim 13, wherein said innermost layer is selected from the group consisting of polypropylene and polyethylene terephthalate.

17. A preform according to claim 13, wherein said inner layer is thermoformed and said outer layer is pressure molded.

18. A preform according to claim 14, wherein said second layer is applied in the flowable form.

19. A preform according to claim 18, wherein said second layer is applied in a manner selected from the group consisting of printing, roller coating and brush coating and spreading.

20. A preform according to claim 13, wherein said second layer includes at least two sub-layers directly adjacent each other to eliminate the effect of a fracture in one of said sublayers.

21. A preform according to claim 13, wherein the barrier layer is thinnest at the upper portion and has a thickness intermediate the sidewall and upper portions at the base portion.

22. A preform according to claim 13, wherein the barrier layer is thicker at the sidewall portion than at the base portion.

23. A container according to claim 13, wherein the barrier layer is thicker at the sidewall portion than at the base portion.

* * * * *